J. JENKINS.

Locomotive-Spring.

No. 8,057. Reissued Jan. 29, 1878.

WITNESSES:

Henry N. Miller

J. H. Scarborough.

INVENTOR:

J. Jenkins.

BY Munn & Co.

ATTORNEYS.

UNITED STATES PATENT OFFICE.

JAMES JENKINS, OF EVANSTON, WYOMING TERRITORY.

IMPROVEMENT IN LOCOMOTIVE-SPRINGS.

Specification forming part of Letters Patent No. 185,542, dated December 19, 1876; Reissue No. 8,057, dated January 29, 1878; application filed November 17, 1877.

*To all whom it may concern:*

Figure 1:
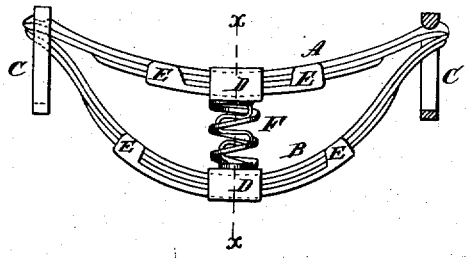
Figure 2:
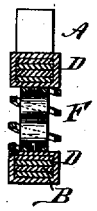

Be it known that I, JAMES JENKINS, of Evanston, county of Uinta, Wyoming Territory, have invented a new and Improved Locomotive-Spring, of which the following is a specification:

In the accompanying drawing, Figure 1 is a side elevation. Fig. 2 is a vertical section taken on line *x x* in Fig. 1.

The invention relates to a spring composed of two independent parts, one being curved and the other nearly flat or straight, and so placed and secured together that their ends, which lie in contact, have free movement on each other lengthwise but not laterally.

The invention further relates to interposing a supplementary spring between said parts, the same forming the median connection of the parts, as hereinafter described.

In the drawing, A indicates the upper part, and B the lower part, of the spring, the ends of the former, A, contacting with and resting upon the ends of the latter, B, within the vertical slot of the hangers C, whose function is to sustain the load and allow free independent movement of one part of the spring upon the other in the direction of the length of the spring. The lower part B is of semi-elliptical form, and composed of several leaves, which are held together and their lateral displacement prevented by the median clips D and side clips E, the latter being formed on the lower leaf of the spring. The upper part A of the spring is nearly straight, and is shown in the drawing as composed of several leaves secured together by clips D E. A cylindrical or spiral spring, F, is placed between the two parts of the spring, the ends of the same bearing against the median clips D. By this construction I produce a spring which has great elasticity, strength, and durability.

What I claim is—

1. A locomotive drive-spring whose upper and lower parts have their ends in contact as shown, and freely and independently movable in guides or hangers, and provided with a median connection, substantially as shown and described.

2. A spring composed of the curved multiple-leaf portion B and the nearly-straight part A, having their contacting ends extended in horizontal, or nearly horizontal, planes, so that they have free sliding movement one on the other in a lengthwise direction, thereby allowing unlimited expansion of the spring, in combination with the slotted hangers or guides C C, which prevent lateral movement of the spring ends, substantially as shown and described.

3. In combination with the parts A B, having their ends disconnected, but in free or sliding contact, and the median clip D, the spring F, placed between said parts and serving as the means of connection, as shown and described.

JAMES JENKINS.

Witnesses:
WM. H. FRANCORN,
ALF. G. LEE.